United States Patent [19]
DeLancey

[11] 3,845,623
[45] Nov. 5, 1974

[54] DRIVE TRANSMISSION
[76] Inventor: Warren H. DeLancey, 1580 Prospect Ave., Apt. H4, Elyria, Ohio 44035
[22] Filed: Apr. 6, 1973
[21] Appl. No.: 348,756

[52] U.S. Cl.................. 60/425, 60/438, 60/483
[51] Int. Cl................................. F15b 11/16
[58] Field of Search....... 60/19, 325, 425, 428, 429, 60/437, 459, 483, 401, 12, 420, 330; 74/720, 720.5, 730

[56] References Cited
UNITED STATES PATENTS

| | | | |
|---|---|---|---|
| 2,067,457 | 1/1937 | Morgan | 60/459 |
| 3,184,913 | 5/1965 | Anderson et al. | 60/19 |
| 3,702,057 | 11/1972 | Rabiger | 60/19 |

*Primary Examiner*—Edgar W. Geoghegan
*Attorney, Agent, or Firm*—Watts, Hoffmann, Fisher & Heinke, Co.

[57] ABSTRACT

An automotive vehicle torque converter is disclosed which comprises a positive displacement pump connected between an input and output shaft, a fluid motor connected to the output shaft and driven by discharge fluid from the pump, and a control valve for governing operation of the fluid motor by the pump as a function of input shaft speed and torque transmitted between the shafts.

When the power available from the vehicle engine operating at a given speed is sufficient to drive the vehicle, the flow of fluid from the discharge of the pump is blocked and the pump drivingly connects the input and output shafts without slip. When the load on the engine increases the valve communicates the pump discharge to the fluid motor so that the input shaft rotates relative to the output shaft to operate the pump. Liquid from the pump discharge drives the fluid motor to transmit torque to the output shaft. The engine speed is maintained at or above its initial level.

The fluid motor in one embodiment comprises a turbine wheel directly coupled to the output shaft. In another preferred embodiment, two turbine wheels are provided, one of which is coupled to the output shaft via epicyclic gearing to enable the transmission of large accelerating torques when the vehicle speed is low. When the vehicle is being accelerated at higher speeds the other turbine wheel can function to transfer torque to the output shaft.

35 Claims, 14 Drawing Figures

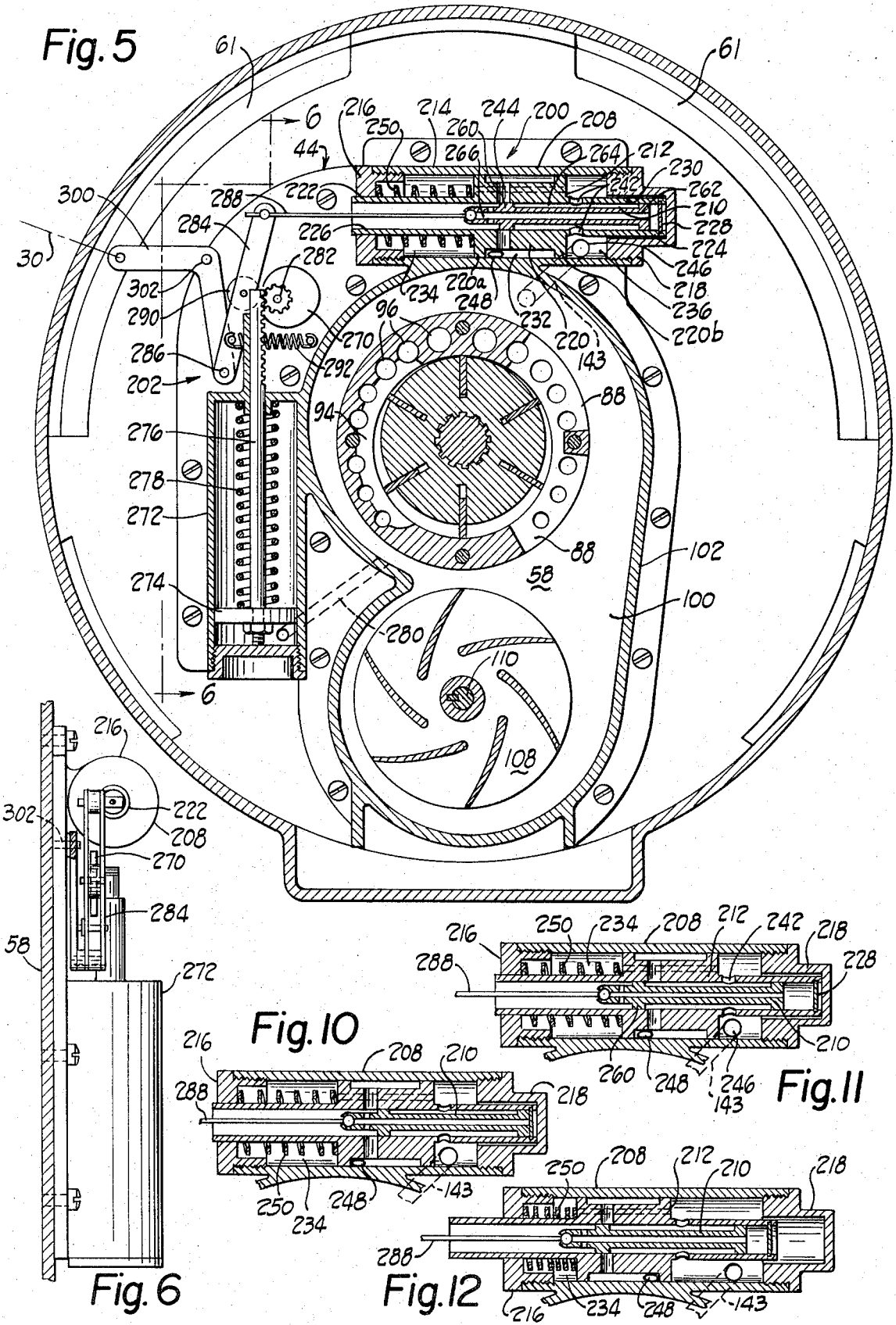

DRIVE TRANSMISSION

BACKGROUND OF THE INVENTION

1. Field of the Invention

The present invention relates to drive transmissions and more particularly relates to fluid torque converters.

Power transmitted by a rotatable driving shaft is directly proportional to the product of the torque and the speed of shaft rotation. In an automotive vehicle when a given amount of driving energy is available from the prime mover, the output shaft of the prime mover will provide adequate torque to propel the vehicle at a given output shaft speed. If the load is reduced, for example if the vehicle is driven down a hill, the output shaft speed is increased and the shaft torque is reduced proportionately. On the other hand if the load is increased, such as by driving up a hill, the output shaft torque is increased and the shaft speed is reduced proportionately.

Reciprocating piston internal combustion engines normally used in automotive vehicles operate most effectively at a particular engine speed at which the torque available from the engine is maximum. This speed is sometimes referred to as the "torque peak" speed. When operated at higher speeds, the torque produced by these engines falls off, combustion efficiency is reduced and undesirable nitrous oxide emissions are produced. When operated at lower speeds under load, the torque is reduced, fuel consumption of the engine becomes excessive and excessive hydrocarbon emissions occur.

In recent years a great deal of effort has been directed towards the reduction of emissions of the character referred to. In the main, these efforts have focused in the area of combustion control and exhaust gas treatment and/or recycling. One area which has not apparently been given a great deal of attention is the variable ratio transmission.

Variable ratio or change gear transmissions have usually been employed in order to permit vehicle engines to operate near the torque peak speed under various operating conditions of the vehicle. Notwithstanding the provision of change speed transmissions, when vehicles have been accelerated from rest it has been common to couple the engine to the drive wheels at low engine speeds. This is a condition which requires maximum power for vehicle movement yet because of the low operating speed of the engine only a minimum power output is available from the engine.

As a result, in order to enable rapid acceleration, common practice has been to provide vehicle engines which have a power capacity considerably greater than that which is required to maintain the vehicle in motion at normal highway speeds. The overcapacity of the engines has tended towards excessive fuel consumption and emissions in normal operation. In particular, when vehicles are accelerated or speed is maintained under heavy loads as when climbing a steep grade, the engines are frequently supplied with more fuel than they can properly burn with the quantity of air being induced at the relatively low speeds of operation. As a consequence large amounts of partially burned fuel are emitted during acceleration and on grades. This kind of operation has led to high quantity hydrocarbon emission which is a significant source of environmental pollution.

2. The Prior Art

There are numerous prior art proposals for transmission constructions and in particular there have been many proposals for the provision of hydraulic torque converters. In general these transmissions have represented attempts to maintain engine speeds relatively high during acceleration and when the vehicle is under load.

Some prior art proposals have employed positive displacement pumps connected between the input and output shafts of the torque converter. When the vehicle loading was such that the power required to drive the vehicle was available from the engine while operating at a given speed, discharge of fluid from the pump was blocked so that the input and output shafts of the converter were locked together by the entrapped, substantially incompressible fluid in the pump. In some proposals when the load on the vehicle increased such that the engine speed was reduced, the pump discharge was throttled to enable the engine speed to remain high while continuing to transmit torque through the pump. This was inefficient because, in effect, the pump functioned like a slipping clutch.

There have been other proposals in which the discharge of a positive displacement pump was communicated to one or more fluid motors which in turn were drivingly connected to the torque converter output shaft. In these proposals when the load on the vehicle increased, relative rotation between the input and output shafts was permitted and the pump was operated. The discharge from the pump drove the fluid motors which in turn applied torque to the converter output shaft.

While these proposals provided for the utilization of energy from the pumped fluid in the form of torque applied to the torque converter output shaft, the actual constructions of these proposals were generally quite complicated, large and cumbersome. Furthermore these constructions were not particularly efficient in the conversion of the energy of the pumped fluid to torque applied to the output shaft.

In some proposed constructions, a plurality of staged positive displacement fluid motors were employed and valving required to enable operation of the motors was both complex and did not adequately respond to conditions of the vehicle operation. For example, during acceleration a fluid motor could be operated to its capacity from the pump with additional pumped fluid being dumped to atmospheric pressure. When such a vehicle climbed a grade, the effect of the increased load was to slow the vehicle speed even though the engine speed increased.

In some constructions the fluid at the pump intake was subjected to subatmospheric pressures which tended to entrain air and/or vapor in the fluid. Another problem with some prior art constructions resided in the absence of engine braking of the vehicles. That is, when the output shaft over ran the input shaft, e.g., while coasting downhill, the shafts were free to rotate relative to each other because the pump discharge was unrestricted.

SUMMARY OF THE INVENTION

The present invention provides a new and improved hydraulic torque converter usable with piston or rotary engines, gas turbines and electric or fluid operated motors. The new torque converter permits full advantage to be taken of the power available from the associated engine or motor when operating at its most efficient speed throughout various load conditions on the torque converter. The new torque converter is extremely efficient and employs components which provide a relatively simple and compact construction.

In particular the new torque converter is effective to enable acceleration of the vehicle from rest to an operating speed with the prime mover of the vehicle providing substantial torque at any given speed and without overloading the prime mover. Where a reciprocating piston engine is associated with the torque converter, the engine is not overloaded nor does the engine operate at poor combustion efficiencies. Still further, the new torque converter enables the use of engines such as gas turbines, which idle at relatively high speeds yet transmission of torque through the torque converter is initiated smoothly and efficiently.

An important ramification of use of a torque converter constructed according to the present invention in automotive vehicles is reduction of vehicle engine displacements and emission. Relatively small vehicle engines can be used since acceleration of the vehicle is accomplished at engine speeds in the vicinity of the engine torque peak speed. This engine speed can be substantially maintained throughout the acceleration of the vehicle to a desired cruising speed. Step-wise gear changes and their attendant relatively great changes in engine operating speed are obviated. The provision of relatively large capacity engines for accelerating vehicles at low engine speeds is thus avoided since the new torque converter permits the operation of smaller engines at high speed and power levels during acceleration. This maximizes the engine's efficiency and minimizes the amount of environmental pollution which results from radically changing engine speeds and/or from operating the engine at inefficient performance levels.

In one preferred embodiment of the invention, the torque converter or drive transmission comprises rotatable input and output shafts, a positive displacement pump connected between the shafts, a fluid motor drivingly connected to the output shaft and communicable with the discharge of the pump so that the fluid motor can be driven from the pump, and a control valve which governs the flow of fluid from the pump discharge to the fluid motor as a function of prime mover speed and torque.

When the torque converter is used in a vehicle transmission and the vehicle is driven at a constant cruising speed, power is transmitted through the torque converter from the input to the output shaft directly through the pump. This discharge of fluid from the pump is blocked and the substantially incompressible liquid contained by the pump, in effect, transmits torque directly between the input and output shafts.

If the torque required to operate the vehicle increases, the control valve senses the resultant increase in fluid pressure at the pump discharge and communicates the pump discharge fluid to the fluid motor. Flow of discharge fluid from the pump enables relative rotation between the input and output shafts so that the engine speed is not reduced. The pumped fluid meanwhile drives the fluid motor which transmits torque to the output shaft. If the vehicle speed is reduced undesirably, the engine speed can be increased to increase the torque transmitted by both the pump and the fluid motor and hence the vehicle speed can be maintained.

The preferred control valve governs the flow of fluid from the pump discharge to the fluid motor as a function of speed of rotation of the input shaft (engine or motor speed), and as a function of the fluid pressure at the pump discharge (indicative of the torque load on the input shaft). The valve preferably comprises a first valving member which is positionable as a function of the engine speed and a second valving member positionable relative to the first valving member as a function of pump discharge pressure. The valving members coact so that the flow of pump discharge fluid to the motor is modulated and torque is normally transmitted to the output shaft by both the pump and the fluid motor in proportions depending upon the flow of pumped fluid.

In one preferred embodiment of the invention the fluid motor comprises a turbine wheel having a relatively large diameter which is rotated by jets of pumped fluid directed onto the turbine wheel by variable nozzles. The turbine wheel is drivingly connected to the output shaft so that when the pump discharge fluid impinges on the turbine wheel vanes, torque is applied to the output shaft. The conversion of the fluid flow energy to mechanical energy by the turbine wheel is relatively efficient and the large diameter of the turbine wheel provides a substantial torque moment arm between the turbine vanes and the output shaft.

The control valve preferably governs operation of the variable turbine nozzles. The turbine nozzles have one condition in which they block the flow of pump discharge fluid to lock the input and output shafts together. When the nozzles are opened slightly they provide high velocity jets of pump discharge fluid which impinge on the turbine vanes to provide substantial torque transfer to the output shaft via the turbine wheel. As the pump discharge pressure is reduced, indicating a reduction in torque, the valve recloses the nozzles enabling the pump to again transmit all of the driving torque between the input and output shafts.

The control valve is also preferably linked to a transmission selector lever so that when the transmission is placed in a "neutral" gear condition, the pump discharge is completely unobstructed and low velocity pumped fluid is directed to the turbine wheel. The low velocity pumped fluid is ineffective to turn the turbine wheel and hence, even if the engine is raced while the transmission is in neutral, the torque converter output shaft is not driven.

An auxiliary intake pressure pump is preferably included in the torque converter for withdrawing fluid from a sump and directing the fluid to the positive displacement torque pump inlet under positive pressure. The auxiliary pump may be of any suitable construction and is driven directly from the torque converter input shaft.

If a vehicle employing the new torque converter is allowed to coast while the transmission is conditioned to provide for forward driving, the torque converter provides for engine braking of the vehicle. When the vehicle coasts, the input shaft speed tends to be reduced while the output shaft speed tends to remain high due to the vehicle motion. Accordingly the output shaft overruns the input shaft causing the torque pump operation to reverse, i.e., fluid is pumped from the normal pump discharge port to the normal pump inlet port. A check valve is provided between the sump and the normal torque pump inlet port. The check valve closes when fluid is discharged from the normal inlet port resulting in the torque pump locking the input and output shafts together so that the vehicle speed is reduced by the braking effect of the engine.

In another preferred embodiment of the invention, the fluid motor includes a pair of turbine wheels which operate in torque amplifying stages. One turbine wheel produces large torque amplification for initially accelerating a vehicle from rest while the other turbine wheel provides for torque amplification at higher vehicle speeds. The first turbine wheel is connected to the torque converter output shaft through a stepdown gear train while the second turbine wheel is either directly coupled to the output shaft or is connected to the shaft via a much lower ratio coupling than the first turbine wheel.

When the vehicle is initially accelerated, the pumped fluid is directed across the vanes of both turbine wheels. Since the output shaft is initially stationary, rotation of the second turbine wheel is strongly resisted; however, due to the stepdown gearing between the first turbine wheel and the output shaft the first turbine is rotated and transmits a large torque to the output shaft via the gearing.

As the output shaft speed increases, the speed of rotation of the first turbine wheel rapidly increases until the pump discharge fluid can no longer propel the turbine wheel. At this juncture torque transmission to the output shaft is accomplished by the second turbine wheel which rotates sufficiently slowly that the pumped fluid issuing from the variable nozzles drives the second turbine wheel and torque is transmitted to the output shaft. The two stage turbine wheel version of the invention is particularly advantageous when used on heavy vehicles such as buses.

The torque converter is preferably disposed in a housing which defines a chamber portion containing the turbine wheel, or wheels, and a separate chamber portion defining a reservoir for operating liquid. The chamber portions are separated by a bulkhead which defines ports above the normal level of liquid in the reservoir chamber. The turbine wheel, or wheels, function to direct liquid in the turbine wheel chamber portion to the reservoir chamber through the ports so that liquid does not accumulate in the turbine wheel chamber portion in quantities sufficient to immerse the turbine wheel or wheels.

Additional advantages and features of the invention will become apparent from the following description of preferred embodiments made with reference to the accompanying drawings which form a part of the specification.

BRIEF DESCRIPTION OF THE DRAWINGS

FIG. 5 is a cross sectional view seen approximately from the planes indicated by the line 5—5 of FIG. 3;

FIG. 6 is a cross sectional view seen approximately from the planes indicated by the line 6—6 of FIG. 5;

FIGS. 10–12 show a portion of the mechanism illustrated in FIG. 5 in different operating conditions;

DETAILED DESCRIPTION OF PREFERRED EMBODIMENTS

Figure 1:
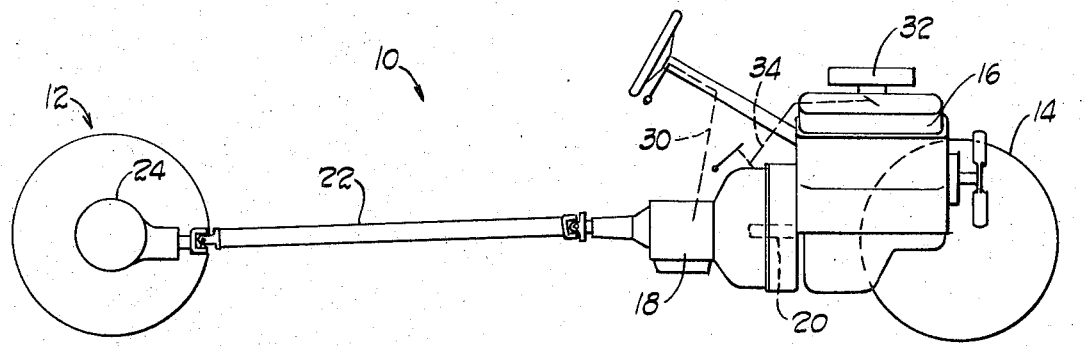
FIG. 1 is an elevational schematic view of a portion of an automotive vehicle embodying the present invention.
Figure 2:
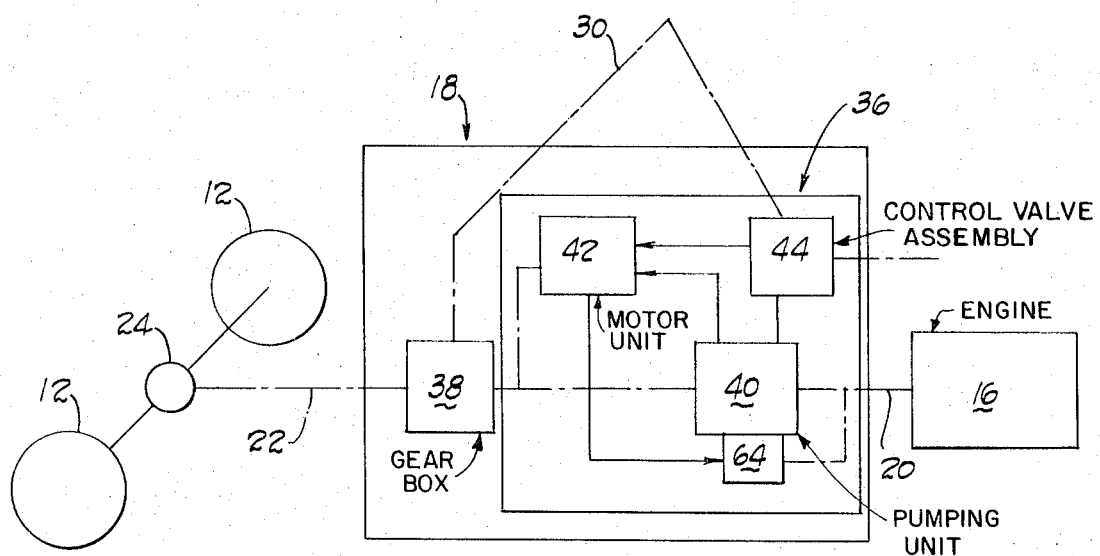
FIG. 2 is a diagrammatic illustration of a portion of the vehicle of FIG. 1.

FIGS. 1 and 2 schematically illustrate an automotive vehicle 10 embodying the present invention. The vehicle 10 comprises wheel pairs 12, 14, a prime mover 16, which is illustrated as a reciprocating piston internal combustion engine, a transmission 18 connected to the prime mover 16 via an input shaft assembly 20 and connected to the driving wheel pair 12 by an output shaft assembly generally indicated at 22. The shaft assembly 22 includes a differential mechanism and drive axles which are indicated at 24.

The transmission 18 is controlled by a selector linkage 30 which includes a shift lever mounted in the passenger compartment on the steering column. The selector linkage 30 can be of any suitable construction and therefore is shown schematically. In the illustrated embodiment of the invention the prime mover 16 is a spark ignition engine whose operation is governed by a carburetor 32 having an associated throttle linkage schematically illustrated at 34 including an accelerator pedal in the passenger compartment.

The transmission 18 is constructed and arranged to provide a "neutral" gear condition in which the engine is disconnected from the drive wheels, a "park" condition in which the transmission is in neutral and the vehicle 10 is braked against rolling, a reverse gear in which the engine is connected to the wheels 12 for backing the vehicle, and a forward driving condition.

In accordance with the present invention the transmission 18 comprises a fluid operated torque converter arrangement 36 for driving the vehicle forwardly through a range of effective driving speed ratios in a stepless fashion. The torque converter is constructed in such a way that the power transmitted to the driving wheels from the engine is optimized as the vehicle load increases and when the vehicle is accelerated to a desired speed. The torque converter 36 enables the engine 16 to operate at, or substantially at, its most efficient operating speed during acceleration of the vehicle and when the vehicle is under load.

Referring now to FIG. 2, the transmission 18 is illustrated schematically as comprising the torque converter 36 and a gear box 38. The torque converter 36 comprises a pumping unit 40 connected between the input and output assemblies 20, 22, a fluid motor unit 42 which is drivingly connected to the output shaft assembly 22 and communicates with the pumping unit 40 for operation by fluid which has been pumped by the unit 40, and a control valve assembly 44 which governs the flow of fluid from the pumping unit 40 to the fluid motor 42 and thereby controls the operation of the fluid motor unit.

The gear box 38 is connected in the shaft assembly 22 between the torque converter 36 and the differential 24. The gear box is schematically shown and preferably provides for the "neutral," "parking" and "reverse" conditions of the transmission 18. When the transmission is in a forward driving condition the gear box merely provides a through drive from the torque converter to the differential and the torque converter governs the effective speed or gearing ratios through which the vehicle is operated. The gear box and its component parts may be of any suitable or conventional construction and accordingly these are not shown in detail nor described further.

The operation of the torque converter 36 is generally as follows:

The pumping unit 40 includes a positive displacement hydraulic pump which is connected between the input and output shaft assemblies 20, 22 so that when the fluid discharge from the pumping unit 40 is blocked, the input and output shafts are directly coupled together by virtue of the hydraulic fluid which is trapped in the pumping unit. In this condition of the torque converter, the fluid motor unit 42 is not provided with discharge fluid from the pumping unit 40. This condition of the torque converter 36 obtains whenever the vehicle 10 is cruising at a desired speed or is otherwise being operated so that the torque required to move the vehicle is readily supplied by the prime mover 16 when the shaft assembly 20 rotates at a given speed.

If the vehicle load should increase, for example when the vehicle 10 encounters a steep uphill grade, the torque required to propel the vehicle is increased. The increase in torque is reflected by an increase the fluid pressure in the pumping unit 40 which is sensed by the control valve assembly 44. The valve assembly 44 in turn permits fluid from the pumping unit 40 to be admitted to the fluid motor unit 42.

When the fluid motor unit 42 is supplied with discharge fluid from the pumping unit 40 the input and output shaft assemblies 20, 22 are enabled to rotate with respect to each other. Hence the engine speed is not reduced and the pumping unit 40 provides a flow of hydraulic fluid to the motor unit 42. The flow rate of pumped fluid depends upon the relative speed of rotation between the shaft assemblies. This operation of the pumping unit 40 and fluid motor unit 42 enables the speed of rotation of the input shaft assembly 20 to be maintained at a desirable level, or increased, while permitting the output shaft assembly 22 to slow down with respect to the input shaft speed in accordance with the load.

The fluid motor unit 42 is drivingly connected to the output shaft assembly 22 and efficiently utilizes the energy of the fluid pumped by the unit 40 to apply driving torque to the output shaft assembly 22. Hence, even though the input and output shaft assemblies 20, 22 may rotate at different speeds, substantially all of the available power produced by the vehicle engine is applied to the driving wheels.

The foregoing general operation of the torque converter 36 enables the speed of the engine 16 to be maintained at desirably high levels when the load on the vehicle is increased so that the engine may continue to operate in the vicinity of its most efficient speed while providing adequate torque for accommodating the additional vehicle loading.

The operation of the torque converter on starting the vehicle from rest is generally similar to that described in connection with accommodating an increased vehicle load. When the operator of the vehicle steps down on the accelerator pedal the control valve assembly 44 functions to initially block fluid discharge from the pumping unit 40 which results in an immediate pressure rise at the discharge of the pump unit 40 because the shaft assemblies 20, 22 tend to rotate with respect to each other. The pressure rise is sensed by the control valve assembly 44 which immediately communicates the fluid motor unit 42 to the pumping unit 40.

The engine speed increases to a level dictated by the accelerator pedal position without regard to the speed of the output shaft assembly. The fluid from the pumping unit is directed to the fluid motor unit for transmitting torque to the output shaft assembly and accelerating the vehicle. The vehicle continues to accelerate and the output shaft speed increases to approach the input shaft speed. This reduces the pumping action of the unit 40 and accordingly the discharge fluid pressure from the unit 40 is also reduced. The reduced fluid pressure is sensed by the control valve which operates to block the discharge from the pumping unit 40 and directly couple the input and output shaft assemblies through the pumping unit.

Figure 3:
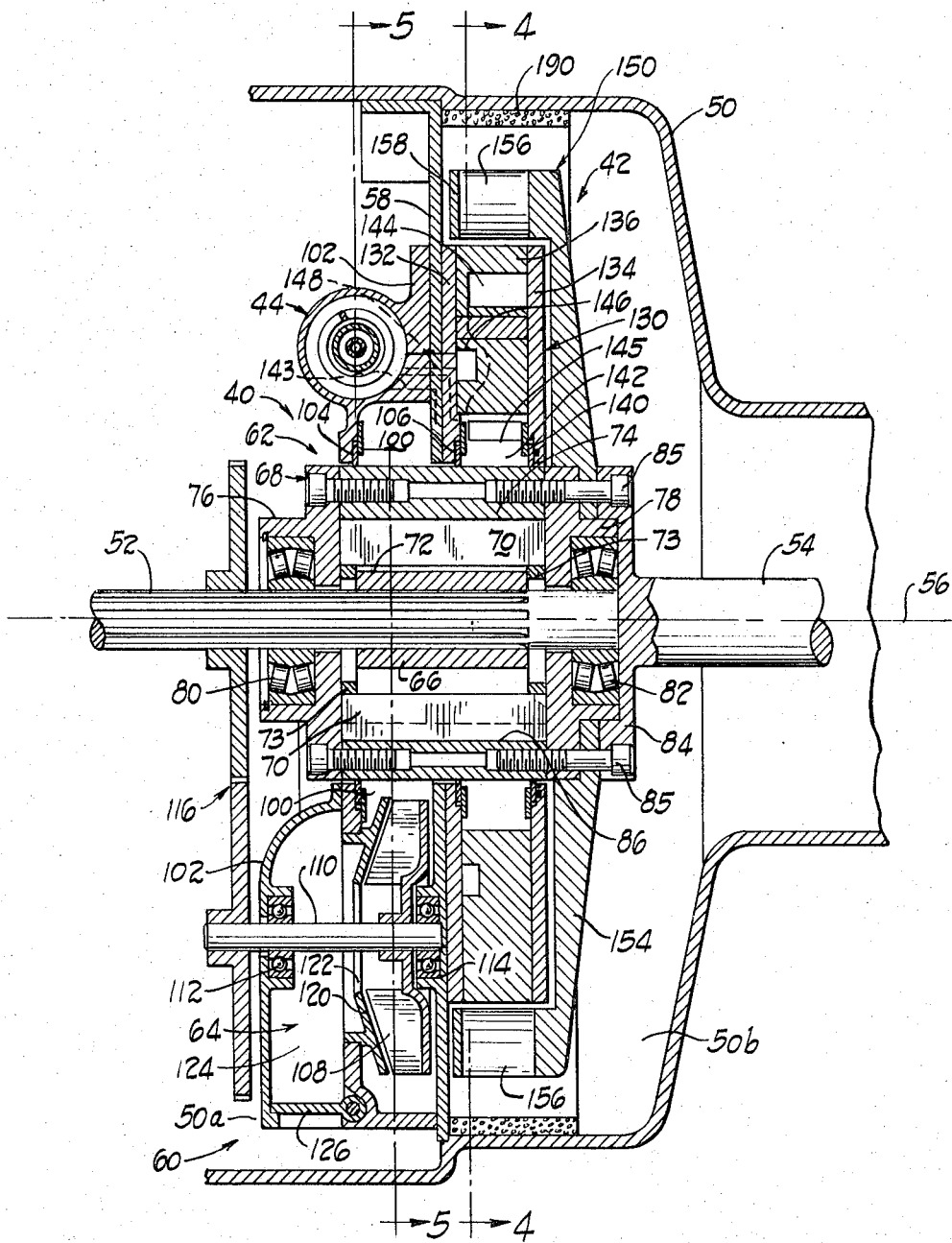
FIG. 3 is a cross sectional view of a torque converter forming part of the vehicle of FIGS. 1 and 2 having portions broken away.
Figure 4:
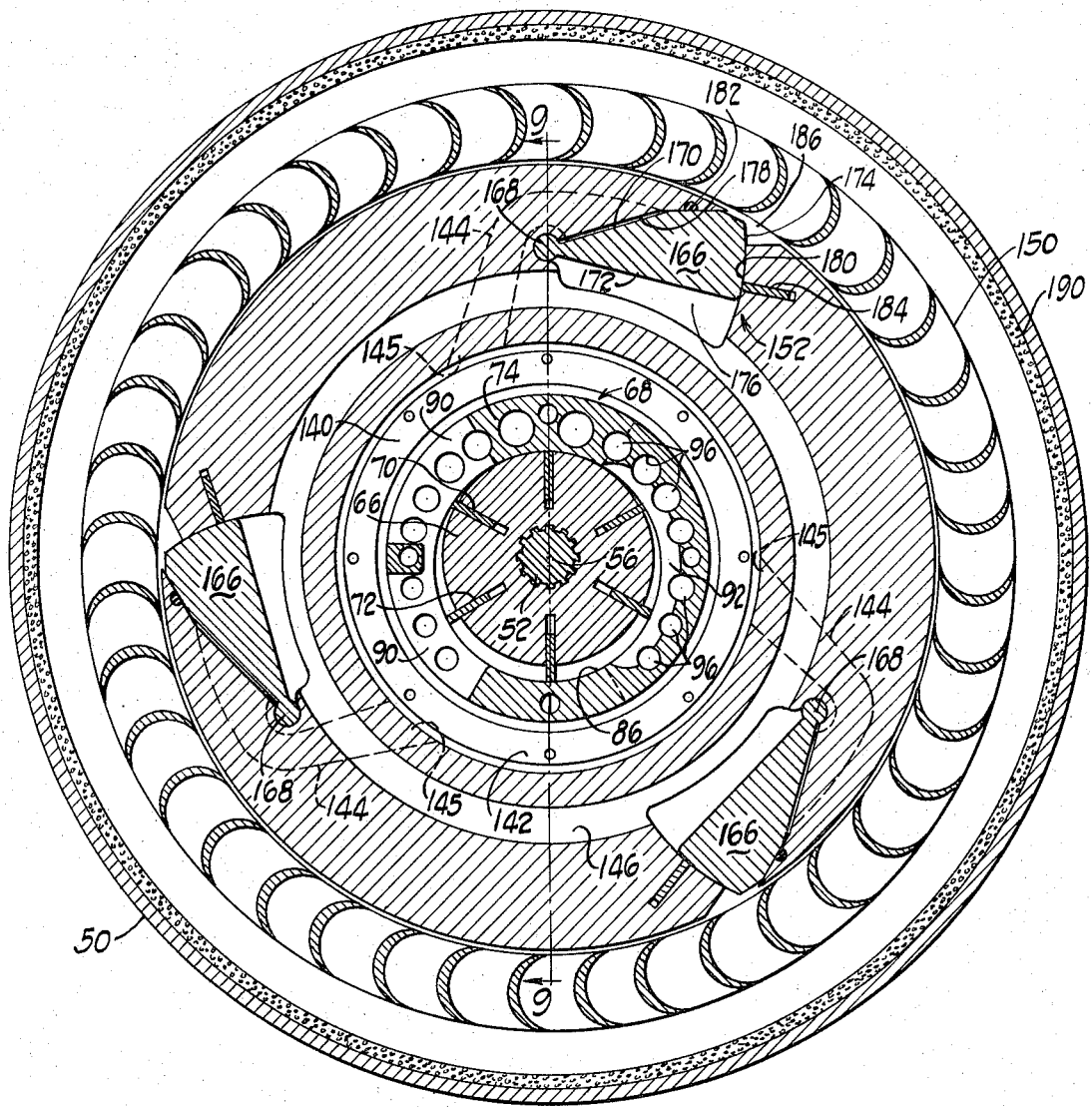
FIG. 4 is a cross sectional view seen approximately from the plane indicated by the line 4—4 of FIG. 3.

One preferred construction of a torque converter 36 embodying the present invention is illustrated in FIGS. 3–5 and is shown disposed within a generally cylindrical housing 50. An input shaft member 52, forming part of the shaft assembly 20, extends into the housing 50 and an output shaft member 54, forming part of the shaft assembly 22, projects into the opposite end of the housing coaxially with the input shaft member 52. The shaft members 52, 54 are rotatable with respect to the housing 50 and each other about a common axis indicated by the reference character 56. The shafts 52, 54 are supported in the housing 50 by suitable bearings and seals which are not illustrated.

An annular supporting plate, or bulkhead, 58 is fixed within the housing 50 and the inboard end of the input shaft member 52 extends through a central generally circular opening in the plate. In the illustrated embodiments of the invention the plate 58 includes axially projecting circumferential flanges by which the plate is fastened to the surrounding housing wall by screws, not shown. The plate 58 partitions the housing 50 to provide axial chambers 50a, 50b. An oil sump 60, only part of which is illustrated in FIG. 3, is located along the bottom of the housing 50 in the chamber 50a and is defined by a recessed housing wall section which depends from the housing. A removable access plug, not illustrated, is provided in the sump to enable drainage of fluid from the housing chamber 50a.

The housing chamber 50a contains a supply of oil which serves to lubricate the various moving parts of the torque converter as well as to provide a source of hydraulic operating fluid for the torque converter. The normal level of the fluid in the chamber 50a is preferably in the vicinity of the axis 56. The normal level of fluid in the chamber 50b is quite low and the plate 58 is provided with circumferential ports 61 (see FIG. 5) to enable fluid to pass from the chamber 50b into the chamber 50a. The manner by which liquid passes through the ports 61 is described below.

The pumping unit 40 is disposed between the adjacent ends of the shafts 52, 54 in the housing 50 and comprises a positive displacement vane-type torque pump 62 and an intake pump 64 which communicates between the sump 60 and the intake of the torque sump 62. The torque sump 62 comprises a rotor 66 drivingly connected to the input shaft 52, a pump housing 68 drivingly connected to the output shaft 54 and pumping vanes 70 which, when the rotor 66 and the pump housing 68 rotate relative to each other, interact between the rotor and pump housing to move oil through the torque pump. As is best seen in FIG. 4, the rotor 66 is formed by a cylindrical collar-like member which is splined to the input shaft 52 and defines axially extending radial slots 72 disposed about the axis of rotation 56. The vanes 70 are disposed within the slots 72 and are maintained in position with respect to the rotor by orbitally slidable vane supporting rings 73 disposed at opposite axial ends of the rotor (see FIG. 3).

The pump housing 68 comprises a generally cylindrical body member 74 which extends concentrically about the axis 56 and annular, axially spaced end plates 76, 78 which are secured to opposite axial ends of the member 74 and extend radially inwardly along the ends of the rotor 66. The end plates 76, 78 support bearings 80, 82, respectively, which are disposed between the respective end plates and the input shaft 52 to rotatably support the pump housing 68 with respect to the input shaft. The output shaft 54 defines a mounting flange 84 at its inboard end to which the pump housing 68 is drivingly connected via load screws 85.

A generally cylindrical pumping chamber 86 is defined within the member 74 and the rotor 66 and vanes 70 are disposed in the chamber. The pumping chamber is formed eccentrically with respect to the axis 56 so that as the rotor 66 and vanes 70 are rotated with respect to the pump housing 68, variable pumping volumes are formed between adjacent vanes, the wall of the pumping chamber 86 and the rotor 66.

The housing member 74 defines an intake port 88 (see FIG. 5) and a discharge port 90 (see FIG. 4) which are disposed on opposite diametrical sides of the housing member 74 and are spaced axially apart along the member 74. When the input shaft 52 rotates at a higher angular velocity than the output shaft 54, oil is drawn into the intake port 88 and expelled from the discharge port 90. This is the normal mode of operation of the pump 62 when it is operating; however, the operation of the pump 62 is reversible so that if the output shaft 54 rotates at a higher angular velocity than the input shaft the pump 62 will tend to draw oil into the normal discharge port 90 and discharge the oil from the normal intake port 88.

In order to facilitate the flow of oil from the intake port 88 into the pumping chamber 86 and from the chamber 86 through the discharge port 90, the member 74 is provided with axially extending relieved chamber wall portions 92, 94 which are radially aligned with the respective ports.

As noted previously, the pumping chamber 86 is formed eccentrically in the member 74 and in order to prevent unbalanced centrifugal forces resulting from rotation of the housing 68 about the axis 56, axially extending balancing holes 96 are formed within the wall of the member 74.

The intake pump 64 supplies oil to the intake of the torque pump 62 under positive pressure so that cavitation and/or entrainment of air or vapor in the oil flowing through the torque pump is avoided. The intake pump 64 is best illustrated in FIGS. 3 and 5 and is preferably a centrifugal pump which functions to draw liquid from the sump 60 and pump the liquid into an intake manifold 100 which surrounds the torque pump intake port 88. The intake manifold 100 is defined by the supporting plate 58 and an intake housing 102 which is mounted on the plate 58. Annular seals 104, 106 extend about the pump housing 68 on opposite axial sides of the intake port 88 to prevent migration of oil to or from the intake manifold along the pump housing 68.

The pump 64 preferably comprises an impeller 108 which is fixed to an impeller drive shaft 110. The shaft 110 is supported between bearings 112, 114 which are fixed to the support plate 58 and housing 102 respectively, at opposite axial sides of the impeller 108. The shaft 110 is directly driven from the input shaft 52 by a conventional gear couple indicated at 116.

The face of the impeller 108 is closed by a wear plate 120 which defines an impeller intake eye 122. The housing 102 forms a suction passage 124 which communicates the sump 60 to the impeller eye 122.

The intake pump 64 is preferably constructed such that the oil pressure in the intake manifold 100 varies in direct proportion to the angular velocity of the input shaft 52 substantially throughout the normal operating speed range of the engine 16.

As has been previously pointed out, the torque pump 62 is a positive displacement pump and its construction is such that it is capable of pumping liquid from the discharge port 90 to the intake port 88 if the output shaft 54 should rotate at a greater speed than the input shaft 52. Since the intake pump 64 is not a positive displacement pump, the torque pump 62 could readily pump fluid to the sump 60 in opposition to the intake pump 64. If this were permitted to occur, the input and output shafts would rotate relative to each other whenever the engine speed dropped while the vehicle was in motion and engine braking of the vehicle, if any, would be minimal. Accordingly, a check valve 126 is disposed in the suction passage 124 to allow oil to flow from the sump 60 through the suction passage 124, but which is closed to prevent the flow of oil from the suction passage 124 into the sump. The check valve 126 thus effectively blocks the flow of pumped liquid to the sump 60 should the torque pump 62 be operated reversely. This locks the input and output shafts together to assure engine braking of the vehicle.

A discharge manifold assembly 130 is disposed about the torque pump discharge port 90 and comprises axial end plates 132, 134 and an annular discharge distributor plate 136 which is sandwiched between the end plates 132, 134. The discharge manifold assembly is connected to the support plate 58 by suitable connectors which have not been illustrated. The seal 106, referred to above in connection with the intake manifold 100, is supported by the end plate 132 while the end plate 134 supports an annular seal 140 which is engaged with and extends about the pump housing member 74 at the opposite axial side of the discharge port 90. The plate 136 has a larger inside diameter than the end plates 132, 134 so that the plates 132, 134, 136 and the seals 106, 140 define an annular discharge chamber 142 which extends about the discharge port 90.

The seals 104, 106 and 140 have inner diameters which engage the cylindrical outer wall of the pump housing 68 to define sealing interfaces with the pump housing member. The seals are preferably supported for radial floating movement with respect to the housing 50 to enable proper alignment of the pump 62 with respect to the housing during assembly and to assure that the sealing interfaces remain effective should the axis 56 be slightly eccentric with respect to the supporting structure for the seals.

The discharge chamber 142 is communicable with both the control valve 44 and the fluid motor 42. As is best seen in FIG. 3 a liquid passageway 143 extends from the chamber 142 to the control valve 44 through the plates 132, 58 and the housing member 102. The discharge chamber 142 is communicable with the fluid motor unit 42 via flow grooves 144 in the distributor plate. As shown in FIG. 4, the pressure distributor plate 136 has three identical flow grooves 144 formed in its axial face which is engaged with the plate 134. The flow grooves 144 are formed 120° apart about the distributor plate and each defines a discharge chamber port 145 by which pump discharge liquid enters the flow grooves 144 from the chamber 142. The flow grooves enable pump discharge fluid to flow to the motor unit 42 in a manner which is described below. The distributor plate 136 also defines an annular pressure groove 146 in its opposite axial face. The groove 146 is closed by the plate 132 and communicates with the control valve 44 via a passageway 148.

The fluid motor unit 42 is communicable with the discharge chamber 142 so that fluid pumped by the torque pump 62 can be directed to the fluid motor unit for driving the motor unit and transmitting torque to the output shaft 54. In the preferred and illustrated embodiment of the invention, the fluid motor unit 42 is disposed in the housing chamber 50b and comprises a turbine wheel 150 and variable nozzle assemblies 152 (see FIGS. 4, 7 and 8) for controlling communication between the torque pump 62 and the turbine wheel 150.

The turbine wheel 150 comprises a hub 154 which is drivingly connected to the output shaft mounting flange 84 so that when the turbine wheel 150 is rotated it drives the output shaft 54. A plurality of axially projecting vanes 156 are disposed about the outer periphery of the hub 154 in a circular array which closely surrounds the outer periphery of the discharge distributor plate 136. An annular shroud ring 158 interconnects the projecting ends of the vanes 156.

The nozzle assemblies 152 are supported by the discharge distributor plate 136 and function to control the flow of pump discharge fluid to the vanes of the turbine wheel. In the preferred embodiment of the invention three identical nozzle assemblies 152 are disposed 120° apart about the discharge distributor plate. Since these assemblies are identical only one is described in detail. Corresponding elements of the other nozzle assemblies are indicated by identical reference characters.

Referring to FIG. 4, each nozzle assembly 152 comprises a generally segmental-shaped nozzle member 166 which is rotatably supported for movement with respect to the distributor plate 136 by a pintle 168. The nozzle member defines opposed pressure faces 170, 172 and a generally cylindrically curved projecting end surface 174. The nozzle member 166 is supported for pivotal movement about the pintle in a distributor plate recess 176. The recess 176 comprises a radially outer wall 178 which is shaped to conform to the side of the nozzle member carrying the pressure face 170 and a generally cylindrically curved wall portion 180 which conforms to the projecting end 174 of the nozzle member. The recesses 176 each open into the pressure groove 146 to enable liquid in the groove to communicate with the nozzle member pressure face 172. The flow grooves 144 open into the respective recesses 176 adjacent the nozzle member pressure face 170.

A resilient seal member 182 extends along the recess wall 178 parallel to the pintle 168 for sealing engagement with the nozzle member 166 when the nozzle member is in a closed position as illustrated in FIG. 4. This prevents passage of fluid between the nozzle member and the recess wall 178. A second seal member 184 is disposed in a groove in the recess wall 180 and is biased into engagement with the curved projecting end surface 174 to prevent flow of liquid between the wall 180 and end surface 174.

When the nozzle member 166 is in the position illustrated in FIG. 4 it blocks the flow of pump discharge liquid through the flow groove 144. When the nozzle member is moved about its pintle so that the pressure face 170 is spaced from the recess wall 178, fluid from the torque pump 62 flows through the flow groove 144, along the face of the nozzle member and is expelled from the distributor plate 136 through a jet port 186 after which it impinges upon the turbine wheel vanes. The jet port 186 is formed by a generally rectangular passage extending from the recess 176 to the outer periphery of the distributor plate and directs the pumped fluid substantially tangentially from the distributor plate.

It should be appreciated that when the nozzle member 166 is in its closed position it both blocks the torque pump discharge to lock the shafts 52, 54 together and prevents the flow of fluid to the turbine wheel 150. When the nozzle member 166 moves slightly away from its closed position, to its position illustrated in FIG. 7, torque pump discharge fluid flows at high velocity through the relatively small area defined between the nozzle face 170 and the recess wall 178 after which the high velocity stream of liquid is directed onto the turbine wheel vanes through the port 186. The turbine wheel is thus driven by the high velocity stream of liquid with the result that turbine wheel supplies torque to the output shaft 54.

Figure 8:
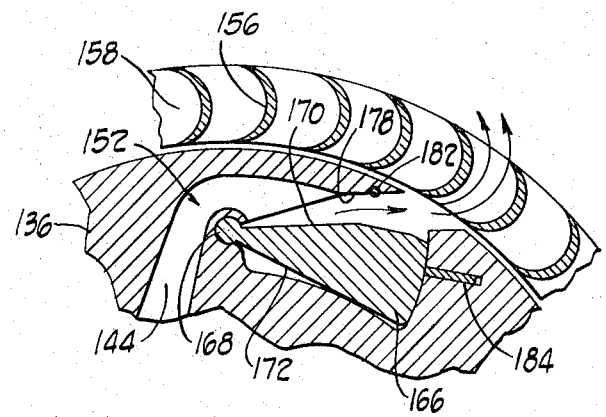
Figure 9:
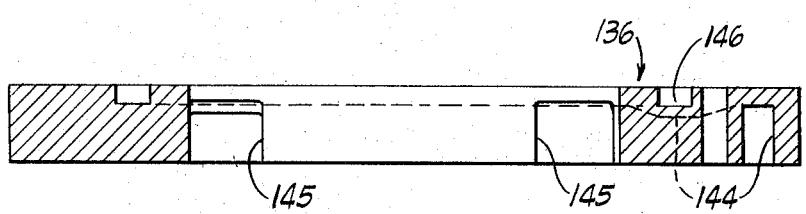
FIG. 9 is a cross sectional view of a part of the apparatus shown in FIG. 4 seen approximately from the plane indicated by the line 9—9 of FIG. 4 with parts removed.

When the nozzle member 166 reaches its limit of travel away from the recess wall 178, as is illustrated in FIG. 8, the flow area between the nozzle face 170 and the recess wall 178 is sufficiently large that the velocity of the liquid exhausted from the jet port 186 is ineffective to drive the turbine wheel 150. This position of the nozzle member 166 is maintained when the transmission 18 is in its "neutral" or "park" condition so that if the engine is raced torque is not transmitted to the output shaft via the turbine wheel which might otherwise occur due to the relative rotation between the input and output shafts.

It has been found that a turbine wheel of the character illustrated and described is highly efficient in converting the energy of the pumped fluid into mechanical energy for transmission to the output shaft 54. Further, torque amplification results from the relatively large diameter of the turbine wheel 150 which provides relatively long lever arm between the location of impingement of the jets on the turbine vanes and the axis of rotation 56.

The torque converter 36 is constructed and arranged so that fluid is directed from the housing chamber 50b to prevent energy losses due to immersion of the turbine wheel in fluid in the housing chamber. Fluid which exits the turbine blades at high velocity is slung outwardly and impinges on the housing wall. This fluid flows circumferentially about the housing wall and tends to spread axially as it flows. A substantial proportion of the fluid passes through the ports 61 in the plate 58 into the housing chamber 50a. Fluid which migrates to the bottom of the housing chamber 50b is picked up and slung by the spinning turbine wheel 150 so that it is circulated around the housing wall. Part of the fluid slung by the turbine wheel passes through the ports 61 so that the housing chamber 50b is readily emptied of fluid which is introduced into it via the nozzle assemblies 152. Normally the fluid level in the housing chamber 50b is maintained just tangent the lowermost portion of the turbine wheel and thus under normal operating conditions the turbine wheel is not immersed in hydraulic fluid which would otherwise tend to impede operation of the turbine wheel.

In the illustrated embodiment of the invention, a ring of resilient porous sound deadening material 190 is fixed to the wall of the housing 50 surrounding the turbine wheel so that fluid which has passed across the turbine wheel vanes impinges on the ring 190. The ring 190 minimizes the noise which would otherwise be created by the fluid striking the housing wall.

The position of the nozzle members 166 is governed by the control valve 44. The control valve 44 is connected to the torque pump discharge to controllably communicate the discharge pressure to the nozzle assemblies 152 via the pressure groove 146 in the fluid distributor plate 136. The pressure in the groove 146 acts on the nozzle member pressure face 172 in opposition to the pressure acting on the nozzle member pressure face 170. When the valve is conditioned to establish a pressure in the groove 146 which is equal to the pump discharge pressure, the nozzle member 166 is urged to its closed position, as illustrated in FIG. 4, to close off flow to the turbine wheel 150 and block the torque pump discharge. This occurs because the pressure surface 172 is larger than the opposed pressure surface 170 on the nozzle member.

It should be noted that the seal 178 functions to limit exposure of the nozzle member to pressure in the flow groove 144 to the area of the surface 172 when the nozzle is closed. When the nozzle is open the static pressure along the nozzle member between the surface 172 and the jet port 186 is reduced because of the velocity of the fluid moving along the nozzle member.

When the valve 44 reduces the pressure in the groove 146 below the pump discharge pressure, the nozzle member 166 swings away from the recess wall 178 as a result of the pressure differential established across the nozzle member. The resulting flow of fluid from the torque pump along the nozzle member reduces the pressure force acting along the face 170 so that the nozzle member is moved to a position at which the pressure forces acting on it are balanced. The valve 44 can thus modulate the pressure in the groove 146 relative to the torque pump discharge pressure to allow modulating movement of the nozzle member 166. The nozzle members 166 preferably fit in the distributor plate somewhat loosely so that a small amount of leakage of fluid from the pressure groove 146 will normally occur. This leakage enables the valve 44 to provide relatively rapid pressure reductions in the groove 146.

When the pressure in the groove 146 is reduced substantially to atmospheric pressure, the nozzle member is fully opened to its position illustrated in FIG. 8. As noted above, in this position the turbine wheel 150 is not driven.

Referring now to FIGS. 5, 6 and 10–12, the control valve assembly 44 comprises a valve 200 and a valve actuator arrangement 202. The valve 200 functions to modulate the operation of the fluid motor unit 42 both as a function of input shaft speed and as a function of torque load between the input and output shafts 52, 54. The valve 200 comprises a valve housing 208 containing a first valving member 210 positionable in the valve housing as a function of the pressure in the torque pump intake manifold 100 (i.e., as a function of engine speed) and a second valve member 212 positionable with respect to the valve housing and the first valving member in response to torque pump discharge pressure (which varies as a function of the torque transmitted by the shafts).

Referring now to FIG. 5, the housing 208 comprises a tubular cylindrical housing member 214 integral with the intake housing 102 and axial end caps 216, 218 which are threaded to the member 214 at its ends. The valving member 212 is slidably disposed within the member 214 and comprises a spool body 220 having axially projecting end portions 222, 224. A central axial bore 226 extends through the valving member.

The spool body end 222 slidably and sealingly projects through an opening in the end cap 216 and the bore 226 opens into the housing 50 from the projecting end 222. The opposite end of the bore 226 is closed and sealed by a suitable cap 228 at the spool body end portion 224. The end portion 224 extends loosely into a closed cylindrical cavity 230 in the housing end cap 218.

The spool body 220 comprises axially spaced circumferential lands 220a, 220b which slidably and sealingly engage the surrounding wall of the housing member 214. The lands 220a, 220b define a chamber 232 between them which extends circumferentially about the spool valve body 220 and circumferential chambers 234, 236 between each land and the adjacent valve housing end cap. The chamber 232 is isolated from the chambers 234, 236 by the lands 220a, 220b.

The valve member end portion 230 is provided with ports 242 which extend between the bore 226 and the surrounding housing chamber 236 while the spool body portion is provided with ports 244 extending between the bore 226 and the chamber 232. A valve housing port 246 opens into the chamber 236 for communicating fluid pressure from the torque pump discharge chamber 142 to the ports 242 in the valve member 212 via the passage 143. A second housing port 248 opens into the chamber 232 for communicating the ports 244 with the pressure groove 146 in the pressure distributor plate 136 via the passage 148.

A helical compression spring 250 surrounds the projecting end 222 of the valving member 212 and reacts between the end cap 216 and the spool body 220 to urge the valving member 212 towards the right as viewed in FIG. 5 to its illustrated position.

The valving member 212 is slidably movable in the valve housing member in response to changes in torque pump discharge pressure. The valving member 212 is movable away from its position illustrated in FIG. 5 in response to increased torque pump discharge chamber pressure which creates an unbalanced pressure force acting axially across the valving member 212 against the bias of the spring 250. As is shown in FIG. 5 the spool body 220 is provided with axially extending pressure balancing holes which extend between the chambers 234, 236 through the spool body 220 to balance the fluid pressure forces acting across the lands 220a, 220b.

The differential area of the valving member 212 is provided by the end cap 228 which is communicated with discharge manifold via the housing port 246. The opposite end of the valving member 212 is exposed to substantially atmospheric pressure within the housing 50 and accordingly when the torque pump discharge pressure rises sufficiently above atmospheric pressure to deflect the spring 250, the valving member 212 moves towards the left as seen in FIG. 5.

It should be apparent from the foregoing description that the valving member 212 provides for pressure communication from the discharge chamber 142 to the pressure groove 146 via the chamber 236, valving member ports 242, the bore 226, spool body ports 244, the chamber 232 and the valve housing port 248. The valving member 210 coacts with the valving member 212 to control the pressure communication between the discharge chamber and the pressure groove.

The valving member 210 is defined by a tubular cylindrical body which is disposed for sliding movement within the bore 226 of the valving member 212. The valving member 210 defines axially spaced lands 260, 262 which sealingly and slidably engage the bore 226.

The lands 260, 262 define a chamber 264 between them within the bore 226. The land 260 has an axial extent which is substantially the same as the diametrical extent of the spool body ports 244, so that when relative movement between the valving members 210, 212 occurs the land 260 can cover and uncover the spool body ports. The fluid communication from the chamber 236 to the chamber 232 via the bore 226 is thus controlled by the land 260.

The valving member 210 is provided with a central bore 266 which opens on opposite axial sides of the lands 260, 262. The bore 266 prevents the establishment of a differential pressure acting across the valving member 210 in the bore 226 which might otherwise impede movement and/or proper repositioning of the valving member 210 within the bore 226.

The valving member 210 is positionable with respect to the valving member 212 irrespective of the torque pump discharge pressure by the valve actuator assembly 202. The valve actuator assembly 202 is operated as a function of input shaft speed and, in the preferred and illustrated embodiment of the invention, causes the valving member 210 to shift within the bore 226 as a function of both engine speed and the engine torque output at the speed of operation of the engine. The actuator assembly 202 comprises a valving member shifting linkage, a cam member 270 for operating the linkage, and a ram for actuating the cam member.

The ram includes a cylinder 272 integral with the intake housing 102, a piston 274 in the cylinder, a piston rod 276 extending from the cylinder to the cam member 270, and a biasing spring 278 reacting between one face of the piston and the cylinder to urge the piston towards its position illustrated in FIG. 5. The opposite face of the piston 274 is communicated with the fluid pressure in the intake chamber 100 by a passageway 280 so that as the intake chamber pressure increases the piston and piston rod are moved against the bias of the spring 278. The spring 278 returns the piston and piston rod toward the position shown in FIG. 5 when intake chamber pressure is reduced. As is noted above the intake chamber pressure is directly proportional to engine speed and hence movement of the piston and piston rod is likewise proportional to engine speed.

The cam member 270 is supported for rotation on the housing 102 by a suitable pin and pinion gear 282 is fixed to the cam. The gear 282 meshes with a rack gear formed on the piston rod 276 so that the cam member 270 is rotated in fixed relation to the linear movement of the piston rod 276.

The valve shifting linkage comprises a lever 284 supported at one end by a pivot pin 286 and connected to the valving member 210 at its opposite end via a link rod 288. A cam follower 290 is carried by the lever 284 between its ends and the cam member 270 is effective to rotate the lever via the follower about the pin 286 to shift the valving member 210. A tension spring 292 maintains the follower 290 engaged with the cam 270.

The face of the cam can have any suitable desired configuration but in the preferred embodiment of the invention the cam face is configured to approximate the torque curve of the engine 16. That is to say, the displacement of the valving member 210 in response to any given engine speed is a function of the torque available from the engine at that speed.

In an automotive vehicle in which the output shaft 54 has substantial inertia, for example if the shaft supports heavy gears in the gear box, it is desirable to prevent the output shaft from rotating when the gear box is in its neutral or park condition, which could occur if the engine is raced. Further, where the torque converter is utilized with a motorcycle or the like, in which there is no gear box the torque converter must be capable of sustaining high engine speeds without transmitting torque. In such an application the torque converter itself must be capable of providing the "neutral gear." The torque converter 36 illustrated in the drawing has a neutral gear capability.

As shown in FIG. 5 the lever pivot pin 286 is supported on a bell crank 300 which is pivoted to a pin 302 supported by the housing 102. The crank 300 is in turn connected to the gear shift linkage 30 so that operation of the gear shift linkage 30 can rotate the crank 300 about the pin 302 to shift the valve lever 284 with respect to the cam 270. The crank 300 is rigidly maintained in its illustrated position in all conditions of the gear shifting linkage 30 except when the linkage 30 operates the transmission to its "neutral" or "park" condition. When the transmission is in "neutral" or "park" the crank 300 rotates clockwise from its position shown in FIG. 5 about the pin 302. This shifts the pivot pin 286 and the lever 284 is fulcrumed about its location of engagement with the cam 270. As a result the valving member 210 is moved into the valving member 212 until the valving member 210 abuts the end cap 228 of the valving member 212. The valving member 210 is maintained substantially in this position irrespective of increases in engine speed because of the angularity between the cam 270 and the lever 284 which prevents the valving member from being shifted appreciably when the cam is rotated.

Referring to FIG. 10, the valving 200 is illustrated in its neutral or park condition. The land 260 is disposed in the bore 226 between the spool valve ports 242, 244. Thus torque pump discharge pressure is not communicated through the valve 200 to the nozzle assemblies 152. Moreover the position of the land 260 communicates the nozzle assemblies to the substantially atmospheric air pressure in the housing 50 resulting in the nozzle assemblies being fully opened, as shown in FIG. 8. Even if the engine is raced the torque converter 36 does not transmit any torque from the input shaft member 52 to the output shaft member 54.

FIGS. 5, 11 and 12 show successive different operating conditions of the valve 200. FIG. 5 illustrates the valve 200 in a condition at which the vehicle transmission is in its forward drive condition, the engine is idling, and the vehicle is at rest. The land 260 of the valving member blocks communication of torque pump discharge pressure through the valve 200 and exposes the value port 244 and pressure groove 146 to atmospheric pressure in the housing 50. The nozzle assemblies 152 are thus in the open positions (FIG. 8) and no torque is transmitted by the torque converter.

FIG. 11 illustrates the condition of the valve 200 when the vehicle 10 is being operated at moderate speed, e.g., 30mph and the engine is producing sufficient power to maintain the vehicle at that speed. The valving member 210 has been moved away from the end cap 228 by the actuator assembly 202 so that the torque pump discharge pressure is communicated to the nozzle assemblies 152 via the valve 200. The nozzle assemblies are thus fully closed (as illustrated in FIG. 4), and the torque pump discharge blocked.

Because the torque required to maintain the vehicle speed is relatively low, the torque pump discharge pressure is relatively low. Accordingly the differential pressure across the valving member 212 is not sufficient to deflect the valve spring 250 and the valving member 212 remains at the limit of its travel in the direction of the valve housing end cap 218. The engine is thus directly coupled to the drive wheels through the torque pump 62 without slip occurring between the torque converter input and output shafts.

Figure 7:
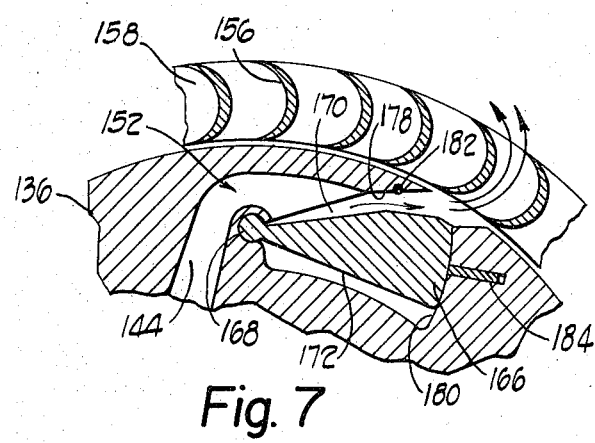
FIGS. 7 and 8 are fragmentary views showing parts of the torque converter illustrated in FIG. 4 in different operating conditions.

FIG. 12 illustrates the condition of the valve 200 when the vehicle is being accelerated from rest or is operating at relatively high speed and climbing a grade. The valving member 210 is shifted substantially towards the valve housing end cap 216 as a consequence of relatively high engine speed. The valving member 212 is likewise shifted towards the end cap 216 as a result of relatively high torque pump discharge pressure. The land 260 of the valving member 210 partially covers the ports 244 of the valving member 212. The valving members 210, 212 thus coact to modulate the pressure communication from the torque pump discharge chamber 142 to the nozzle assemblies. In this condition of the valve 200 the nozzle assemblies are partly open, as shown in FIG. 7, causing the turbine wheel to be rotated by high energy discharge fluid from the torque pump. The engine speed thus remains relatively high while torque transmission to the torque converter output shaft 54 is accomplished by the torque pump 62 and turbine wheel 150 acting in concert.

It should be pointed out at this juncture that the valve actuator assembly 202 which has been illustrated and described can be modified appropriately to govern the position of the valving member 210 in response to various parameters reflecting engine speed. By way of example, the actuator 202 could be modified for operation from engine intake manifold pressure or by sensing the engine output shaft speed by suitable electrical and/or mechanical devices.

Figure 13:
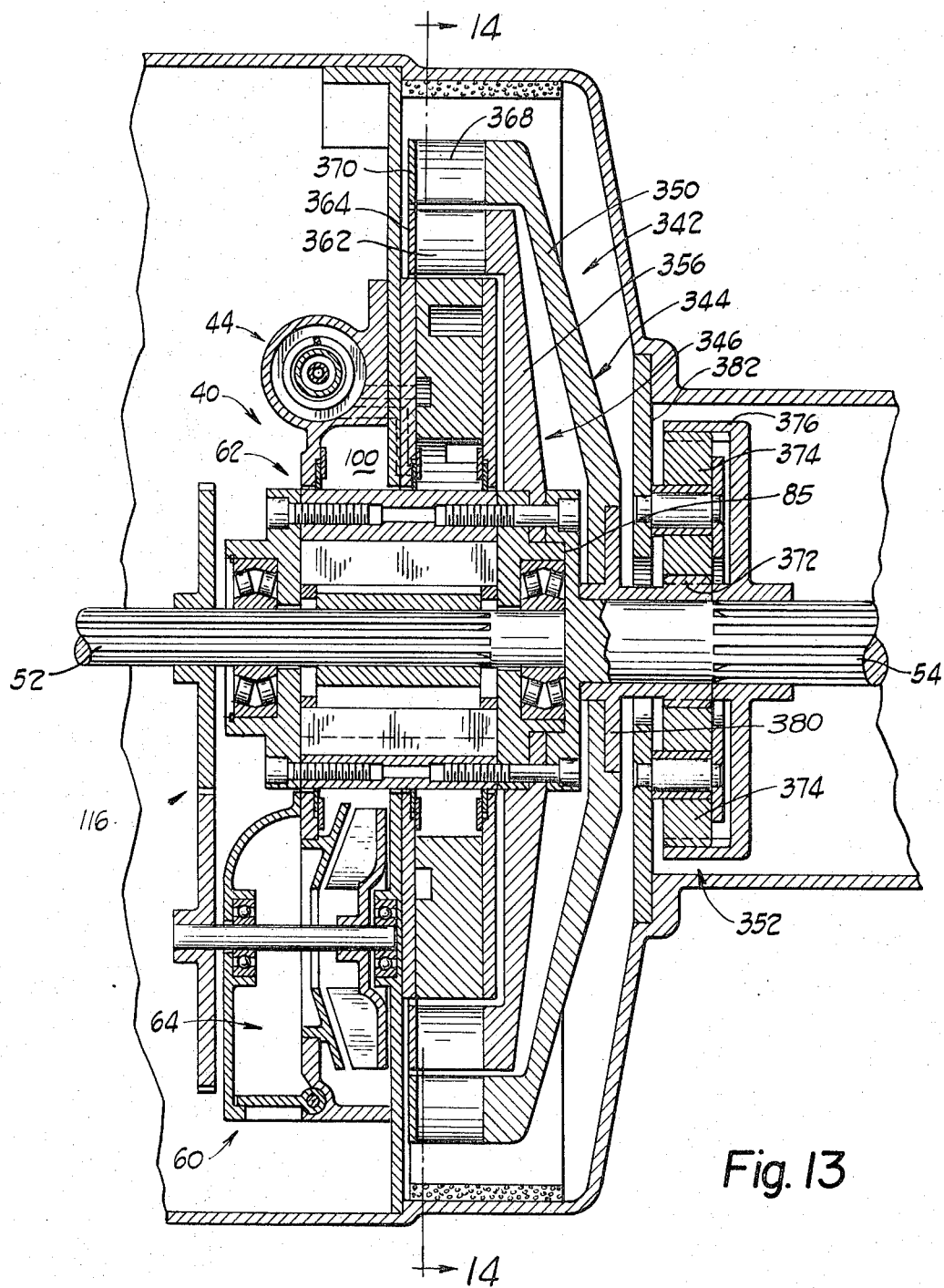
FIG. 13 is a cross sectional view of a modified embodiment of the present invention similar to FIG. 3; and, FIG. 14 is a cross sectional view seen approximately from the plane indicated by the line 14—14 of FIG. 13.
Figure 14:
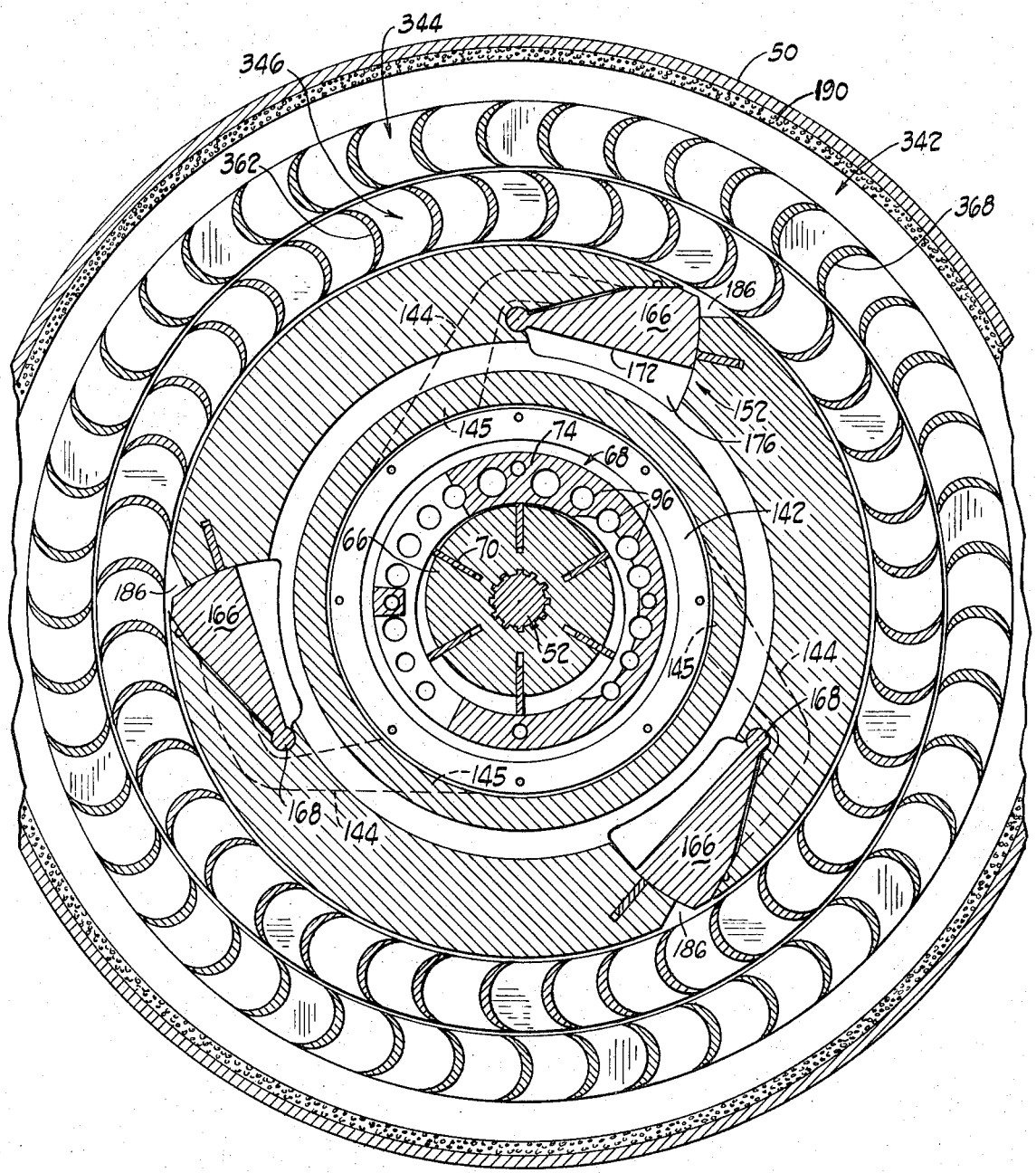

A modified torque converter embodying the present invention is illustrated in FIGS. 13 and 14. The torque converter of FIGS. 13 and 14 differs from the torque converter described in reference to FIGS. 1–12 only in the construction of the fluid motor and accordingly only the modified fluid motor 342 is described in detail. Other components which are identical to those previously described are indicated by corresponding reference characters.

The motor 342 is particularly adapted for use in a large vehicle, such as a passenger bus, and functions to produce extremely large torque amplification for accelerating the vehicle from rest, yet is effective to provide adequate torque amplification for accommodating increased vehicle loads when the vehicle is operating at speed. The motor unit 342 comprises staged turbine units 344, 346 which function to transmit torque to the output shaft the torque relative rotation between the shafts 52, 54 drives the1torque pump 62.

The first stage turbine unit 344 comprises a turbine wheel 350 which is connected to the output shaft 54 via a gear reduction 352 and is effective primarily to transmit accelerating torque to the output shaft 54 when the shaft 54 is rotating relatively slowly. The second stage turbine unit comprises a turbine wheel 356, substantially like the turbine wheel 150 of FIGS. 1–12, which primarily transfers torque to the shaft 54 when the shaft 54 is rotating at relatively higher speeds.

The second stage turbine wheel 356 comprises a central hub drivingly connected to the output shaft mounting flange 85 and axially projecting vanes 362 arrayed circumferentially about the periphery of the distributor plate 136. The projecting ends of the vanes are interconnected by a shroud ring 364.

The vanes 362 are illustrated in cross section in FIG. 14 and, as shown, the vane configuration is such that liquid from the jet ports 186 impinges on the vanes to urge the turbine wheel clockwise as viewed in the FIGURE.

The liquid which has crossed the turbine vanes is directed radially from the turbine wheel and away from the direction of movement of the turbine vanes. The liquid passing from the vanes 362 is directed to the turbine wheel 350.

The turbine wheel 350 comprises central hub which supports axially projecting vanes 368 arrayed circumferentially about the vanes of the turbine wheel 356. As shown in FIG. 14 the cross sectional shape of the vanes 368 is such that fluid leaving the vanes of the turbine wheel 356 impinges on the vanes 368 to drive the wheel 350 counterclockwise as viewed in FIG. 14. The projecting tips of the vanes are interconnected by a shroud ring 370.

The gear reduction 352 is connected between the hub of the turbine wheel 350 and the output shaft 54 and is preferably an epicyclic gear train. The gear train comprises an input sun gear 372 rotatably disposed about the shaft 54, four planet gears 374 surrounding the sun gear 372 and a ring gear 376 surrounding the planet gears and splined to the shaft 54.

The sun gear 372 carries a flange 380 to which the turbine wheel 350 is drivingly connected by suitable fasteners, not shown. The planet gears mesh with the sun gear and are rotatably supported by a cage plate 382 fixed to the torque converter housing 50.

The epicyclic gear train 352 provides a substantial ratio between the rotational speed of the turbine wheel 350 and that of the output shaft 54 resulting in substantial amplification of torque applied to the turbine wheel by the fluid. Thus at low output shaft speeds, driving of the turbine wheel 350 by the torque pump discharge fluid provides large torques to the output shaft.

As output shaft speed increases, the rotational speed of the turbine wheel 350 increases proportionately until the torque pump discharge fluid impinging on the vanes 368 produces minimal torque. By this time however, the torque pump fluid impinging on the vanes 362 of the more slowly spinning turbine wheel 356 supplies adequate torque to the output shaft.

If desired a one-way, or sprague-type, clutch can be placed in the gear train 352 at a desired location so that the turbine wheel 350 is capable of driving the output shaft 54 via the gear reduction, but the gear reduction does not transmit substantial driving energy from the shaft 54 to the turbine wheel 350. The one-way clutch is not illustrated.

While two embodiments of the invention have been illustrated and described in considerable detail, the invention is not to be considered limited to the precise constructions shown. Various adaptations, modifications and uses of the invention may occur to those skilled in the art to which it relates and the intention is to cover all such adaptations, modifications and uses of the invention which come within the spirit or scope of the appended claims.

What is claimed is:
1. A drive transmission comprising:
   a. rotatable input shaft means;
   b. rotatable output shaft means;
   c. positive displacement pump means connected between said input and output shaft means, said pump means defining a fluid inlet and fluid discharge and effective to pump fluid from said inlet through said discharge in response to relative rotation between said input and output shaft means;
   d. fluid motor means drivingly connected to said output shaft means and communicable with said fluid discharge of said pump means, said fluid motor means driven by fluid discharged from said pump means to transmit torque to said output shaft means in response to relative rotation between said input and output shaft means; and,
   e. control valve means communicating with said discharge of said pump means for governing the flow of fluid through said pump discharge to said motor means, said valve means comprising a valving means positionable as a function of speed of rotation of said input shaft means and as a function of torque applied to said pump means so that said valve means governs the flow of pump discharge fluid to said motor means in relation to input shaft means speed and torque applied to said input shaft means.

2. A transmission as claimed in claim 1 wherein said motor means comprises a turbine wheel connected to said output shaft means and nozzle means for directing fluid discharged from said pump to said turbine wheel so that said turbine wheel transfers torque to said output shaft means.

3. A transmission as claimed in claim 2 wherein said nozzle means communicates said pump discharge to said turbine wheel, said valve means operatively connected to said nozzle means to govern the flow of pump discharge fluid through said nozzle means.

4. A transmission as claimed in claim 2 wherein said motor means further comprises a second turbine wheel concentric with said first turbine wheel and connected to said output shaft means by a speed reducer, said second turbine wheel effective to transmit torque to said output shaft means when the speed of rotation of said output shaft means is relatively slow and said first turbine wheel transmitting torque to said output shaft means when the speed of said output shaft means is relatively high.

5. A transmission as claimed in claim 2 wherein said nozzle means comprises a nozzle member movably supported in a fluid discharge flow passage between said pump discharge and said turbine wheel, said nozzle member movable in said flow passage to vary the velocity of pump discharge fluid directed to said turbine wheel, said valve means effective to control the position of said nozzle member by the application of differential fluid pressure to said nozzle member.

6. A transmission as claimed in claim 5 wherein said nozzle member is supported for movement relative to said flow passage through a range of movement between a first position wherein said nozzle member substantially blocks flow through said passage and a second position wherein flow through said passage is substantially unimpeded by said nozzle member, said nozzle member defining a first pressure area exposed to said pump discharge and a second pressure area opposed to said first area and exposed to fluid in communication with said control valve means, said second pressure area being larger than said first pressure area and movement of said nozzle member relative to said flow passage being governed by differential pressure force acting on said nozzle member pressure areas.

7. A transmission as claimed in claim 1 wherein said pump means comprises a vane pump having a rotor member connected to one of said input and output shaft means for rotation therewith about an axis of rotation, a surrounding chamber defining member connected to the other of said input and output shaft means for rotation about said axis with said other shaft means, said pump inlet defined by a first port in said chamber member, said pump outlet defined by a second port in said chamber member spaced along said axis from said first port, and seal means disposed axially between said first and second ports.

8. A transmission as claimed in claim 7 further comprising a second pump means driven from said input shaft means and communicating with said first port.

9. A transmission as claimed in claim 1 wherein said valving means comprises a first valving member positionable as a function of the speed of rotation of said input shaft means and a second valving member positionable in response to fluid pressure at said pump means discharge, said first and second valving members coacting to govern the flow of pump discharge to said motor means.

10. A transmission as claimed in claim 9 wherein said input shaft means is connected to a prime mover and said control valve means further comprises a first valving member actuator comprising an actuator member movably positionable in relation to the speed of operation of the prime mover and a second actuator member operatively associated between said first actuator member and said first valving member for shifting the valving member in accordance with the torque available from the prime mover at the speed of operation of the prime mover.

11. The transmission claimed in claim 10 wherein said second actuator member comprises a cam element movable by said first actuator member and defining a cam surface configured according to the torque curve of the prime mover.

12. The transmission claimed in claim 1 further comprising an intake pump driven by said input shaft means and effective to provide intake fluid under positive pressure to said inlet of said pump means.

13. A drive transmission comprising:
a. rotatable input shaft means;
b. rotatable output shaft means;
c. positive displacement pump means connected between said input and output shaft means, said pump means defining an intake port and a discharge port and effective to pump fluid from said intake port to said discharge port in response to relative rotation between said shaft means;
d. fluid motor means for transmitting torque to said output shaft means and comprising a turbine wheel connected to said output shaft means; and,
e. means for variably communicating said pump discharge port with said motor means.

14. A transmission as claimed in claim 13 wherein said means for variably communicating said pump discharge port to said motor means comprises a variable flow controlling nozzle means operative to govern the flow and velocity of pump discharge fluid to said turbine wheel.

15. A transmission as claimed in claim 14 wherein said means further comprises control means governing operation of said variable nozzle means as a function of rotational speed of said input shaft means and torque transmitted between said shaft means via said pump means.

16. A drive transmission as claimed in claim 15 wherein said control means comprises valve means communicating with the discharge port of said pump means and comprising a first valving member shiftable as a function of pressure at the pump discharge port and a second valving member shiftable as a function of speed of rotation of the input shaft means, said valving members coacting to govern operation of said motor means as a function of pump discharge pressure and input shaft means speed.

17. A drive transmission as claimed in claim 13 wherein said turbine wheel comprises a hub portion connected to said output shaft by speed reducer means, said speed reducer means effective to amplify the torque applied to said output shaft means by said turbine wheel.

18. A drive as claimed in claim 13 wherein said fluid motor means further comprises a second turbine wheel having circumferentially arrayed vanes disposed radially adjacent said vanes of said first mentioned turbine wheel, and said means for communicating said pump discharge port to said motor means comprises variable nozzle means effective to direct fluid serially to the vanes of said first and second turbine wheels to drive said turbine wheels, said second turbine wheel connected to said output shaft means by a speed reducer mechanism whereby said second turbine wheel is primarily effective to transmit torque to said output shaft means when the output shaft means rotates at relatively low speeds and said first turbine wheel functions primarily to transmit torque to said output shaft means when the output shaft means rotates at relatively higher speeds.

19. A torque converter comprising:
a. a housing;
b. rotatable input shaft means having an end portion projecting into said housing;
c. rotatable output shaft means having an end portion projecting into said housing;
d. displacement pump means in said housing connected between said input and output shaft means, said pump means defining an intake port and a discharge port;
e. fluid motor means communicable with said pump discharge port and drivingly connected to said output shaft means, said fluid motor means comprising a turbine wheel driven by fluid discharged from said pump when said shaft means rotate relative to each other;
f. flow controlling means between said pump discharge and said fluid motor means for variably restricting flow of fluid from said discharge port to govern the torque transmitted between said shaft means via said pump means and said fluid motor means;
g. said housing defining first and second chamber portions having a bulkhead therebetween, said pump means intake port disposed in fluid communication with said first chamber portion and said turbine wheel supported in said second chamber portion, said bulkhead defining at least a port elevated above the fluid level in said first chamber portion and said turbine wheel effective to direct fluid from said second chamber portion to said first chamber portion through said bulkhead port.

20. A torque converter as claimed in claim 19 further comprising an intake pump in said first housing chamber portion, said intake pump driven from said input shaft means and effective to supply fluid to said pump means inlet port at positive pressures.

21. A torque converter as claimed in claim 19 further including sound deadening material disposed circumferentially about said turbine wheel in said second chamber portion.

22. In a torque converter comprising:
a. rotatable input shaft means;
b. rotatable output shaft means;
c. displacement pump means drivingly connected between said input and output shaft means, said pump means defining an intake port and a discharge port;

d. structure defining a reservoir for substantially incompressible fluid communicable with said pump intake port, said pump means effective to pump fluid from said reservoir through said discharge port and to transmit torque between said shaft means in relation to back pressure at said discharge port;

e. fluid motor means communicable with said pump means discharge port and drivingly connected to said output shaft means to transmit torque to said output shaft means when fluid flows to said motor means from said discharge port; and, f. flow controlling means for governing communication between said motor means and said pump discharge port, said flow controlling means comprising a flow governing member movably supported in a pump discharge flow passage between said pump discharge port and said fluid motor, and valve means for controlling the position of said flow governing member, said flow governing member positionable between a closed position wherein fluid flow from said pump discharge port is blocked and torque is transmitted between said shafts via said pump means and a second position wherein fluid discharged from said pump flows to said motor means, said flow governing member defining opposed pressure faces communicable with fluid at the pump discharge pressure and with said valve means respectively whereby movement of the flow governing member is determined by differential pressure applied across the pressure faces.

23. A torque converter as claimed in claim 22 wherein said valve means communicates with said pump discharge port and with said respective flow governing member pressure face, said valve means comprising a first valving member positionable as a function of input shaft means speed and a second valving member positionable as a function of pump discharge pressure, said valving members coacting to effect modulation of the pressure differential across said flow governing member pressure faces.

24. A torque converter as claimed in claim 22 wherein said fluid motor means comprises a turbine wheel and said flow controlling means governs the flow and velocity of pump discharge fluid directed to said turbine wheel.

25. A torque converter comprising:
a. a housing;
b. rotatable input shaft means extending into said housing;
c. rotatable output shaft means extending into said housing;
d. displacement pump means disposed between said shaft means and effective to pump fluid in said housing in response to relative rotation between said input and output shaft means;
e. said pump means comprising a pump housing member connected to one of said input and output shaft means for rotation about an axis, said pump housing member defining a fluid inlet port and a fluid discharge port spaced axially apart along said pump housing member;
f. said housing comprising a bulkhead structure defining an opening disposed generally in a plane transverse to said axis and through which said pump housing member extends, said pump inlet and discharge ports disposed on opposite axial sides of said plane; and, g. first seal means for preventing fluid flow between said ports along said pump housing member and through said opening, said seal means comprising at least a sealing member defining a sealing interface with said pump housing member, said sealing interface being radially shiftable with respect to said opening in said bulkhead structure.

26. A torque converter as claimed in claim 25 further comprising intake manifold structure defining an intake manifold extending about said pump housing member in communication with said inlet port, intake pump means for directing fluid into said intake manifold, and second seal means for preventing fluid flow from said intake manifold along said pump housing member, said seal means comprising a sealing member defining a sealing interface with said pump housing member, said sealing interface being radially shiftable with respect to said intake manifold structure, and said pump means inlet port disposed axially between said first and second seal means.

27. A torque converter as claimed in claim 25 further comprising pump discharge manifold structure supported by said housing and defining a discharge manifold extending about said pump housing member in communication with said discharge port, said manifold structure comprising second seal means for preventing fluid flow from said discharge manifold structure along said pump housing member, said second seal means comprising at least a sealing member defining a sealing interface with said pump housing member, said sealing interface being radially shiftable with respect to said discharge manifold structure, and said discharge port disposed axially between said first and second seal means.

28. A torque converter as claimed in claim 27 further comprising fluid motor means operable by fluid discharged from said pump means to transmit torque to said output shaft means when said shaft means rotate relative to each other, said discharge manifold structure comprising at least a port opening into said discharge manifold and at least a flow passage communicating said manifold port to said fluid motor means, and variable nozzle means supported by said manifold structure for controlling the flow of fluid to said motor means.

29. A torque converter as claimed in claim 28 wherein said fluid motor means comprises a rotatable turbine wheel drivingly connected to said output shaft means, said turbine wheel defining a series of blades circumferentially surrounding said discharge manifold structure, said nozzle means defining a fluid jet port for discharging fluid to said blades in a direction generally tangent to said turbine wheel.

30. A torque converter comprising:
a. a housing;
b. rotatable input shaft means extending into said housing;
c. rotatable output shaft means extending into said housing;
d. displacement torque pump means disposed in said housing and drivingly connected between said shaft means for pumping fluid when said shaft means rotate relative to each other, said pump means defining a fluid inlet port and a fluid discharge port;

e. pump discharge fluid distributor means stationarily supported in said housing and surrounding said pump discharge port, said fluid distributor means comprising fluid distributor structure disposed above said pump discharge port, said distributor structure defining at least part of a discharge manifold communicating with said pump discharge port and at least one fluid flow passage extending between said discharge manifold and an outer peripheral location on said distributor structure;

f. variable nozzle means effective to govern the flow of fluid through said flow passage, said nozzle means comprising at least a nozzle member positionable between a first position wherein flow through said passageway is blocked and a second position wherein said fluid flow is substantially unimpeded, said nozzle member operable to provide high velocity jets of pump discharge fluid when positioned between said first and second positions; and, g. fluid jet operated fluid motor means drivingly connected to said output shaft means and acted upon by fluid jets from said nozzle means to transfer torque to said output shaft means when said input and output shaft means rotate relative to each other.

31. A torque converter as claimed in claim 30 wherein said fluid distributor structure comprises first and second generally annular members connected together in axially abutting relationship, said fluid flow passage defined by and between said first and second members, and said nozzle member movably supported by at least one of said first and second members.

32. A torque converter as claimed in claim 31 wherein said fluid distributor structure further comprises a third annular member in axial abutting engagement with one of said first and second annular members, said nozzle member defining opposed pressure faces and positionable between its first and second positions in response to differential pressure force exerted on said nozzle member pressure faces, and a pressure groove defined by and between said third annular member and said one of said first and second annular members, said pressure groove communicating with one of said nozzle member pressure faces and substantially isolated from communication with said fluid flow passageway.

33. A torque converter comprising:
a. rotatable input shaft means;
b. rotatable output shaft means;
c. displacement pump means drivingly connected between said input and output shaft means, said pump means defining a fluid inlet port and a fluid discharge port;
d. fluid motor means defined at least in part by a rotatable turbine wheel drivingly connected to said output shaft and defining an array of circumferentially spaced turbine vanes disposed radially outwardly from said pump means;
e. fluid discharge distributor means disposed radially between said pump means and said turbine vanes, said distributor means defining at least a fluid flow passage for communicating pump discharge fluid from said pump discharge to said turbine vanes; and,
f. flow controlling means operable to govern the flow of fluid in said flow passage, said flow controlling means having a closed condition wherein the flow of pump discharge fluid is blocked causing said input shaft means to positively drive said output shaft means via said pump means and open positions wherein pump discharge fluid is directed for impingement on said turbine wheel vanes for transmitting torque from said turbine wheel to said output shaft means.

34. A torque converter as claimed in claim 33 wherein said fluid discharge distributor means defines at least one jet port through which said pump discharge fluid is directed to said turbine wheel, said at least one jet port disposed radially inwardly from said turbine wheel vanes.

35. A torque converter as claimed in claim 34 wherein said jet port is defined by an opening in said fluid distributor means which is oriented to direct fluid generally tangentially with respect to the axis of rotation of said turbine wheel.

* * * * *